(Model.)
S. CHADWICK.
PROCESS OF MAKING PHOTOGRAPHIC COPIES OR FAC SIMILES OF DRAWINGS, &c.
No. 259,094. Patented June 6, 1882.
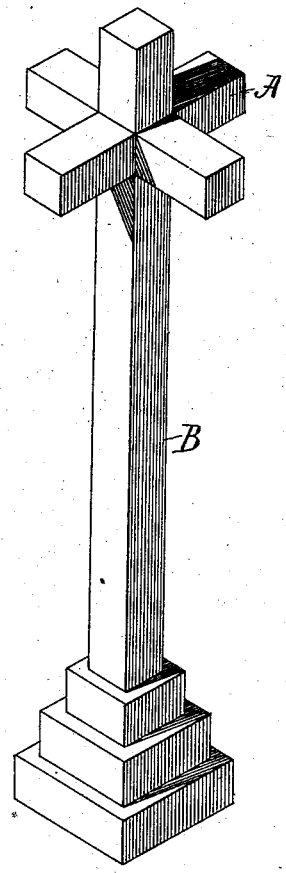
WITNESSES:
INVENTOR

UNITED STATES PATENT OFFICE.

SAGER CHADWICK, OF PHILADELPHIA, PENNSYLVANIA.

PROCESS OF MAKING PHOTOGRAPHIC COPIES OR FAC-SIMILES OF DRAWINGS, &c.

SPECIFICATION forming part of Letters Patent No. 259,094, dated June 6, 1882.

Application filed August 4, 1881. (Specimens.)

*To all whom it may concern:*

Be it known that I, SAGER CHADWICK, of the city and county of Philadelphia, and State of Pennsylvania, have invented a new and useful Improvement in Photographic Copies of Drawings, Line-Work, and Manuscripts and the Process of Making the Same; and I do hereby declare the following to be a sufficiently full, clear, and exact description thereof and the mode of making the same to enable others skilled in the art to make and use the said invention.

The nature of this invention consists in an improved process of producing fac-similes in improved ferroprussiate colors, and an improved sensitizing solution used in the said process containing gum soluble in water, ferroprussiate of potash, and ammonia and iron chemically combined with a vegetable acid, whereby a definite sharpness and clearness of outlines are obtained in the resulting copy or fac-simile not heretofore practicable.

I will now proceed to particularly describe the said invention and the means employed in making the same.

Referring to the drawing annexed, the outlines A represent blue color of ferroprussiate on a white or natural field or ground, B.

To produce this copy or fac-simile the following process and mixture of ingredients are employed: First clean a glass plate with aquafortis and wash it. Then coat it with the following solution: gelatine, one hundred and twenty grains; chrome-alum, thirty grains; water, ten ounces. When dry flow over it collodion prepared as follows: alcohol, ten ounces; ether, ten ounces; gun-cotton, one hundred grains; iodide of potassium, forty grains; iodide of cadmium, sixty grains; bromide of cadmium, sixty grains. Then immerse the plate in a bath of the following solution: distilled water, ten ounces; nitrate of silver, (C. P.,) one ounce; nitric acid, (C. P.,) one drop. After an immersion of about five minutes the plate is taken out and drained; then placed in a dark-slide and exposed in a camera for about three minutes to the drawing to be reproduced. The plate is then taken to a dark room and flowed with the following solution: photosulphate of iron, one-half ounce; photosulphate of iron and ammonia, one-half ounce; acetic acid, one ounce; water, sixteen ounces. When the image has been developed the plate is fixed with a solution of the following proportions: cyanide of potassium, one ounce; water, eight ounces. When fixed the plate or image is intensified with a weak solution of sulphuret of potassa. When the plate has become dry it is ready to print from by placing back of it, in a pressure-frame, paper, or other support, material prepared in the following manner: red prussiate of potassium, one hundred and twenty grains; citrate of iron and ammonia, one hundred and forty grains; water, one ounce; gum-arabic, ten grains, or other equivalent known substitute soluble in water, is applied to the paper by means of a sponge, and then exposed to sunlight for from five to ten minutes. When printed the material is placed in clean water and thoroughly washed. The result is a fac-simile of the original with blue lines on a plain ground.

The fac-similes or product resulting from the process is distinguishable from any others heretofore known by the following peculiarities.

First. The lines are in blue ferroprussiate color in the ground or field of the natural color instead of being upon a ground containing portions of the sensitizing compound bleached by chemical reagents.

Second. The field or ground does not discolor or fade. The action or effect of the soluble gum or its equivalent substitute is to combine with the sensitizing chemical on exposure to light and become insoluble, and where protected from light it remains easily soluble in water and facilitates the removal of all traces of the sensitizing compound, and thus leaves the field of the natural ground or material, in contradistinction to the processes in which portions of the sensitizing compound are carried into the paper or other ground of the field and bleached by chemical reagents where they are liable to afterward fade or discolor.

I am aware that it has been proposed to print by photographic process with an ordinary negative in ferroprussiate color on paper and textile fabrics, and afterward to bleach the ground or field by chemical reagents, which process I do not claim; but

What I claim as my invention is—

1. The process hereinbefore described of producing fac-similes in ferroprussiate colors, which consists essentially in combining gum-arabic or an equivalent substitute with the ferroprussiate sensitizing solution, forming the lines or image thereon by exposure to light, and then divesting the ground or field of soluble and surplus prussiate by means of water, substantially in the manner and for the purpose set forth.

2. The sensitizing solution consisting of gum-arabic or an equivalent substance, mixed with ferroprussiate of potash, and ammonia and iron chemically combined with a vegetable acid, as and for the purpose set forth.

SAGER CHADWICK.

Witnesses:
LINN WHEELER,
J. DANIEL EBY.